(No Model.)
C. F. MAVIS.
ATTACHMENT FOR HARROWS FOR CUTTING THISTLES.
No. 585,962. Patented July 6, 1897.
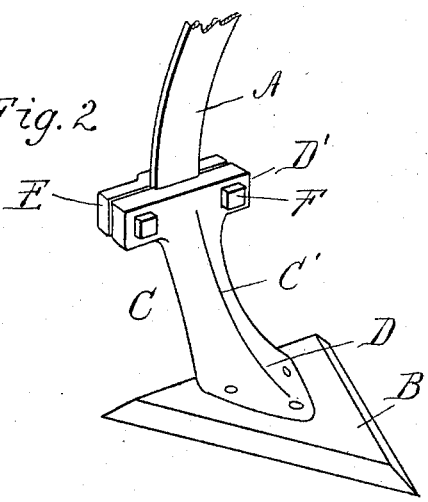
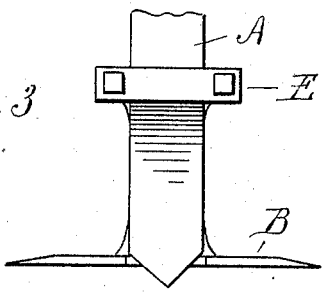
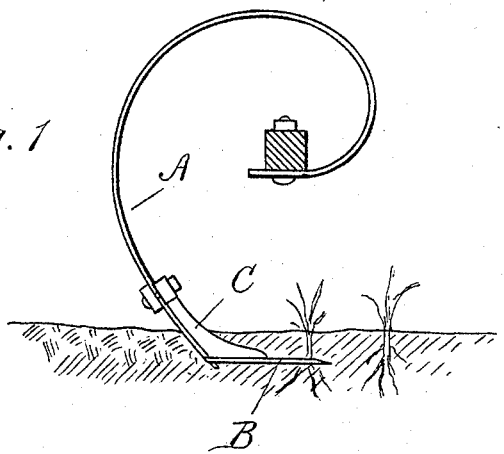
Witnesses:
P. M. Hulbert
Otto F. Bartlett
Inventor:
Charles F. Mavis
By ____, Attys.

UNITED STATES PATENT OFFICE.

CHARLES F. MAVIS, OF GALE, MICHIGAN.

ATTACHMENT FOR HARROWS FOR CUTTING THISTLES.

SPECIFICATION forming part of Letters Patent No. 585,962, dated July 6, 1897.

Application filed November 20, 1896. Serial No. 612,814. (No model.)

*To all whom it may concern:*

Be it known that I, CHARLES F. MAVIS, a citizen of the United States, residing at Gale, in the county of St. Clair and State of Michigan, have invented certain new and useful Improvements in Attachments for Harrows for Cutting Thistles, &c., of which the following is a specification, reference being had therein to the accompanying drawings.

The invention consists in the construction of an attachment to spring-tooth harrows for cutting thistles, and particularly in a horizontal blade secured at its rear end to a rearwardly-inclined bracket or standard and a clamp for detachably holding this bracket upon the end of a spring-tooth harrow, so that when thus attached the horizontal blade will run a short distance beneath the surface of the ground and effectually cut off thistles and similar weeds, so that I am able by my attachment to transform the ordinary spring-tooth harrow into a simple and effective thistle-cutter, all as more fully hereinafter described.

In the drawings, Figure 1 is a side elevation of a spring-tooth harrow, showing my attachment as in use. Fig. 2 is an enlarged perspective view of the lower end of such tooth and my attachment. Fig. 3 is a rear elevation thereof.

A is a tooth of any ordinary spring-tooth harrow to which my attachment is to be applied.

The attachment consists of a horizontal blade B, preferably triangular in plan, as shown, and with sharpened edges coming to a forward point, as will be seen by an inspection of Fig. 2.

C is a rearwardly-inclined bracket or standard connected centrally to the rear portion of this blade, its forward face C' being substantially V-shaped, as shown, and its lower portion or foot D extending nearly horizontally over the blade. At the rear of the blade and bracket is formed a gain or socket into which the lower portion of the spring-tooth is adapted to engage. At each side of the upper end are the ears D', across which a clamping-plate E engages, the device being clamped on the spring-tooth by means of suitable bolts or screws F.

A harrow being provided with such attachment if drawn over the ground the horizontal blades will run parallel with the surface a slight distance below the same, as shown in Fig. 1, and effectually cut off all the weeds (such as thistles) in its path. The tapering or pointed blade effects a shearing cut of such roots or weeds. The inclined foot D and the V-shaped face C are designed to enable the device to be drawn through the ground with the least possible resistance to effect the desired result.

With such attachment I am enabled to quickly transfer an ordinary harrow into a thistle or weed cutting device without in any way impairing its value for use as a harrow when the attachment is removed.

What I claim as my invention is—

1. An attachment for spring-tooth harrows, comprising a horizontal flat blade, a rearwardly-inclined bracket to which the blade is attached, and a clamp for detachably holding the bracket on the lower end of a spring-tooth.

2. An attachment for spring-tooth harrows comprising a horizontal pointed sharpened blade, a rearwardly-inclined bracket having the foot D and V-shaped face C secured to the rear portion of the blade and a clamp for detachably securing this bracket to the lower end of a spring-tooth, substantially as described.

3. An attachment for spring-tooth harrows, comprising a flat sharpened blade, a rearwardly-inclined bracket to which said blade is attached, means on the bracket for attachment to a harrow-tooth, and a gain or socket in the blade through which the tooth engages, substantially as described.

4. An attachment for spring-tooth harrows, comprising a pointed flat sharpened blade, a rearwardly-inclined V-shaped bracket to which said blade is attached, ears on the bracket comprising one member of the attaching means to the tooth, the plate E constituting the other member, and bolts clamping together and controlling the last two members, substantially as described.

In testimony whereof I affix my signature in presence of two witnesses.

CHARLES F. MAVIS.

Witnesses:
CHARLES H. PALMER,
BENJ. CLYNE.

It is hereby certified that the residence of the patentee in Letters Patent No. 585,962, granted July 6, 1897, upon the application of Charles F. Mavis, for an improvement in "Attachments for Harrows for Cutting Thistles," was erroneously written in the grant and printed at the head and in the preamble of the specification "Gale, Michigan," whereas said residence should have been written and printed *Yale, Michigan;* and that the said Letters Patent should be read with this correction therein that the same may conform to the record of the case in the Patent Office.

Signed, countersigned, and sealed this 20th day of July, A. D. 1897.

[SEAL.]

WEBSTER DAVIS,
*Assistant Secretary of the Interior.*

Countersigned:
A. P. GREELEY,
*Acting Commissioner of Patents.*